C. LANGE.
STEERING DEVICE FOR AUTOMOBILES.
APPLICATION FILED AUG. 30, 1918.

1,291,937. Patented Jan. 21, 1919.

Inventor
C. LANGE
By H. S. Hill
Attorney

UNITED STATES PATENT OFFICE.

CHARLES LANGE, OF WEST ANAHEIM, CALIFORNIA.

STEERING DEVICE FOR AUTOMOBILES.

1,291,937. Specification of Letters Patent. Patented Jan. 21, 1919.

Application filed August 30, 1918. Serial No. 252,089.

*To all whom it may concern:*

Be it known that I, CHARLES LANGE, a citizen of the United States, residing at West Anaheim, in the county of Orange, State of California, have invented a new and useful Steering Device for Automobiles; and I do hereby declare the following to be a full, clear, and exact description of the invention, such as will enable others skilled in the art to which it appertains to make and use the same.

The present invention relates to a steering wheel mounting for motor vehicles, and has for its object to provide a device of this character which embodies novel features of construction whereby a substantially unobstructed clearance space is permitted to remain between the front seat of the vehicle and the dashboard thereby enabling the driver of the vehicle to occupy his seat with comfort.

Further objects of the invention are to provide a steering wheel mounting which leaves a clear space in front of the driver's seat and avoids the usual steering post construction which projects over the lap of the driver and not only forms a source of danger and discomfort to the driver but also destroys the lines and appearance of the vehicle, which can be applied without the necessity of any very great changes to any conventional motor vehicle, and which will enable the vehicle to be effectively guided in its movements without any annoyance or discomfort.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Corresponding and like parts are referred to in the following description and indicated in all the views of the drawings by the same reference characters.

Figure 1:
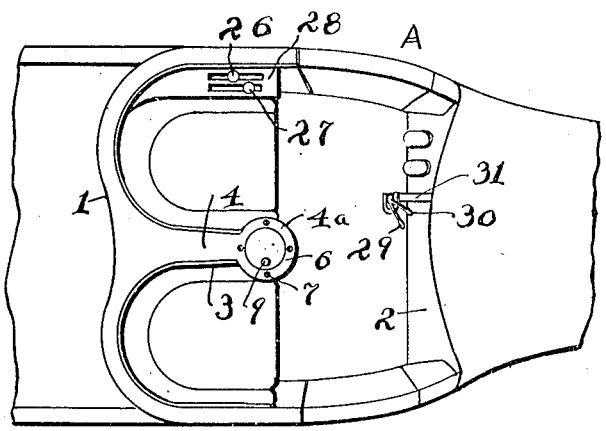
Figure 1 is a top plan view of a motor vehicle provided with a steering wheel mounting constructed in accordance with the invention, the front and rear ends of the motor vehicle being broken away.
Figure 2:
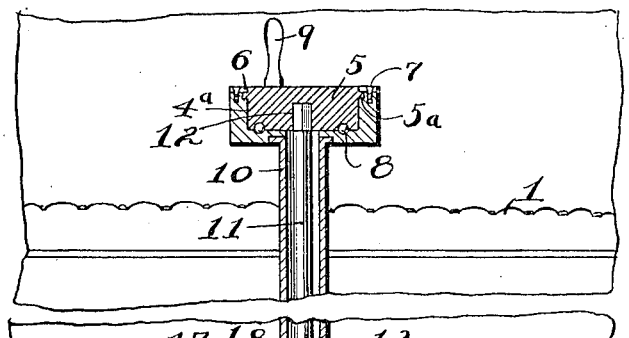
Fig. 2 is a transverse vertical sectional view through the steering wheel mounting, portions being broken away.
Figure 3:
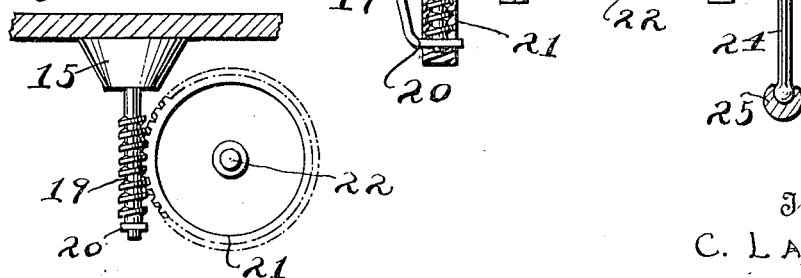
Fig. 3 is a side elevation of the worm gearing which is arranged under the floor of the vehicle.

Referring to the drawings, which illustrate one embodiment of the invention, the numeral 1 designates the front seat of a conventional motor vehicle A, and 2 the dashboard which is arranged in front of the seat. An upright division wall or partition 3 which is provided at the top thereof with an arm rest 4 divides the front seat 1 into two spaces, one of which can be occupied by the driver and the other by a passenger. The forward end of the arm rest 4 is enlarged and recessed at 4ª to receive a a steering wheel 5 which is rotatably mounted within the recess and arranged with the top thereof flush with the top of the arm rest. The steering wheel 5 is provided with a peripheral flange 5ª which fits loosely within the rabbeted mouth of the recess 4ª and is engaged by a retaining ring 6, said ring fitting upon the top of the arm rest and being fastened in position by suitable means such as the screws 7. The bottom of the steering wheel and base of the recess 4ª are provided with corresponding annular raceways receiving anti-friction balls 8. The steering wheel is thus mounted to rotate freely within the recess, although the retaining ring 6 coöperates with the flange 5ª to prevent accidental displacement of the steering wheel. The steering wheel itself is flush with the top of the arm rest, so that there are no projections to cause annoyance or discomfort, and a handle 9 projects upwardly from the periphery of the steering wheel to admit of the wheel being readily turned by the driver of the vehicle.

A tubular steering post 10 extends downwardly from the arm recess 4 through the division wall 3 and seat 1, said post receiving the steering wheel shaft 11 which extends loosely through the same. The ends of the steering wheel shaft are shown as being polygonal in shape, one end thereof fitting loosely within a polygonal opening 12 in the steering wheel, while the other end fits loosely within a polygonal opening 13 in a cone 14 which is arranged at the lower end of the steering post 10 and journaled within a corresponding bearing 15. Anti-friction balls 16 surround the cone 14 and are mounted within corresponding raceways provided in the cone and bearing. A cover 17 is fitted removably upon the upper end of the bearing 15 and this cover is provided with a flange 18 into which the lower end of the steering post 10 is fitted, thereby holding the steering post and bearing securely in proper relative position. A worm 19 is carried by the cone 14 and projects downwardly therefrom, the lower end of the worm being journaled within a suitable bearing 20. This worm meshes with a worm gear 21 which is rigidly applied to a transversely extending steering lever shaft 22, said shaft being journaled within suitable bearings 23 and provided with a steering lever 24. A drag link 25 of the conventional construction is connected to the steering lever 24 and this drag link may be operatively connected in the usual manner to the front wheels of the vehicle.

In order to leave an unobstructed clearance space in front of the seat 1, the emergency brake lever 26 and gear shifting lever 27 may be arranged to project through a ledge 28 on the opposite side of the driver's seat. Similarly the throttle lever 29 and spark control lever 30 may be mounted upon a short post 31 projecting from the dashboard 2 in front of the driver. The control elements of the vehicle are thus all positioned so that they can be conveniently manipulated by the driver of the car, although the driver occupies a seat which has no obstructions in front of the same and the usual unsightly and uncomfortable steering post and steering wheel mounting is avoided. The steering post itself is completely let into and obscured by the arm rest so that there are no unsightly projections, and at the same time the steering wheel is in such a position that it can be conveniently manipulated by the driver of the vehicle to direct and control the movements of the vehicle in the necessary manner.

Having thus described the invention, what I claim as new and desire to secure by Letters Patent, is:—

1. In a steering wheel mounting for motor vehicles, the combination with the front seat and an arm rest associated therewith, said arm rest being recessed, of a steering wheel housed within and journaled in the recessed portion of the arm rest, a crank handle projecting upwardly from the steering wheel for turning the same, and a steering wheel shaft extending downwardly through the arm rest and seat and operatively connected to the steering wheel.

2. In a steering wheel mounting for motor vehicles, the combination with the front seat and arm rest associated therewith, said arm rest being recessed, a steering wheel journaled within the recessed portion of the arm rest and provided with a flange, a retaining ring fitted to the top of the arm rest and engaging the flange to hold the steering wheel in position, and a steering wheel shaft extending downwardly through the arm rest and seat and operatively connected to the steering wheel.

3. In a steering wheel mounting for motor vehicles, the combination with the front seat and an arm rest associated therewith, of a steering wheel mounted directly upon the arm rest, a steering wheel shaft extending downwardly through the arm rest and seat and operatively connected to the steering wheel, a cone at the lower end of the steering wheel shaft, a bearing for the cone, a worm carried by the cone, a worm gearing meshing with the worm, and a steering lever shaft rigid with the worm wheel.

4. In a steering wheel mounting for motor vehicles, the combination with the front seat and an arm rest associated therewith, of a steering wheel mounted directly upon the arm rest, a tubular steering post extending downwardly from the arm rest through the seat and floor of the vehicle, a bearing at the lower end of the tubular steering post, a cone journaled in the bearing, a steering wheel shaft extending through the steering post and having one end connected to the steering wheel while the other end is connected to the cone, a worm rigid with the cone, a worm wheel meshing with the worm, and a steering lever shaft actuated by the worm wheel.

5. In a steering wheel mounting for motor vehicles, the combination with the front seat and an arm rest associated therewith, of a steering wheel mounted directly upon the arm rest and provided with a polygonal recess, a tubular steering post extending downwardly from the arm rest through the seat, a bearing at the lower end of the tubular post, a cone journaled within the bearing and formed with a polygonal recess, a steering wheel shaft extending through the tubular post and provided with polygonal ends adapted to enter and interlock with the corresponding recesses in the steering wheel and cone, a worm projecting from the cone, a worm wheel meshing with the worm, and a steering lever shaft actuated by the worm wheel.

6. In a steering wheel mounting for motor vehicles, the combination with the front seat and an arm rest associated therewith, said arm rest being recessed, a steering wheel journaled in the recess and housed therein, a crank handle projecting upwardly from the steering post, a tubular steering post extending downwardly from the arm rest through the seat, a bearing applied to the lower end of the tubular post, a cone within the bearing, a steering wheel shaft extending through the tubular post and having a detachable and interlocking connection with the steering wheel and cone respectively, a worm projecting from the cone, a worm wheel meshing with the worm, and a steering lever shaft actuated by the worm wheel.

In testimony whereof I have signed my name to this specification in the presence of two subscribing witnesses.

CHARLES LANGE.

Witnesses:
Geo. H. Beckman,
M. L. Litton.